United States Patent [19]

Dix et al.

[11] Patent Number: 5,245,643
[45] Date of Patent: Sep. 14, 1993

[54] TOP FILLED WATER REGIONS OVERLYING PART LENGTH FUEL RODS

[75] Inventors: Gary E. Dix, Saratoga; Bruce Matzner, San Jose, both of Calif.

[73] Assignee: General Electric Company, San Jose, Calif.

[21] Appl. No.: 851,714

[22] Filed: Mar. 16, 1992

[51] Int. Cl.⁵ .............................. G21C 15/00
[52] U.S. Cl. .................... 376/371; 376/282; 376/439; 376/444
[58] Field of Search ............. 376/443, 377, 371, 434, 376/426, 439, 444, 282; 976/DIG. 60, DIG. 59, DIG. 63

[56] References Cited

U.S. PATENT DOCUMENTS

| | | | |
|---|---|---|---|
| 4,708,846 | 11/1987 | Patterson et al. | 376/441 |
| 4,753,774 | 6/1988 | Taleyarkhan et al. | 376/444 |
| 4,755,348 | 7/1988 | Shiralkar et al. | 376/282 |
| 4,777,016 | 10/1988 | Yoshioka et al. | 376/444 |
| 4,812,286 | 4/1989 | Gluntz | 376/282 |
| 4,822,557 | 4/1989 | Suzuki et al. | 376/282 |
| 5,068,082 | 11/1991 | Ueda et al. | 376/428 |
| 5,112,570 | 5/1992 | Dix et al. | 376/370 |

Primary Examiner—Donald P. Walsh
Assistant Examiner—Meena Chelliah
Attorney, Agent, or Firm—J. S. Beulick

[57] ABSTRACT

Part length water regions are located above part length fuel rods in boiling water nuclear reactor fuel bundles. The part length water regions include discrete containers having entry ports at the top of the part length water regions for capturing water, and vent ports for permitting internally generated steam to escape. The advantages of improved neutron moderation in the upper portion of the fuel assembly are maintained while the uranium fuel removal requirements are minimized.

10 Claims, 6 Drawing Sheets

TOP FILLED WATER REGIONS OVERLYING PART LENGTH FUEL RODS

This invention relates to a fuel bundle for a boiling water nuclear reactor having so-called part length fuel rods. More specifically, a fuel bundle design is disclosed in which part length fuel rods have top filled water regions or containers overlying the end of the part length fuel rods for the improvement of the nuclear performance of the fuel design.

BACKGROUND OF THE INVENTION

Fuel bundle designs for boiling water nuclear reactors are known. Such fuel designs are fabricated in a standard fashion including a lower tie plate for supporting an upstanding matrix of fuel rods in side-by-side relation and permitting the inflow of water coolant into the fuel bundle. Most of the fuel rods of such a fuel bundle extend from the supporting lower tie plate to an upper tie plate. This upper tie plate serves to maintain the fuel rods in upstanding side-by-side relation and to permit the exit of water and generated steam from the fuel bundle.

The fuel bundle is typically surrounded by a fuel bundle channel, which channel surrounds the lower tie plate, extends upwardly around the fuel rod matrix, and surrounds the upper tie plate. This fuel bundle channel isolates the flow path through the fuel bundle so that water and steam generated in the interior of the fuel bundle are separate from the so-called core bypass region surrounding the fuel bundle. This core bypass region contains water moderator and occupies generally cruciform shaped volumes between the fuel rods into which control rods can penetrate for the absorption of thermal neutrons for the control of the nuclear reaction.

In operation of the boiling water nuclear reactor fuel bundles, liquid moderator—water—is introduced at the bottom of the fuel bundle through the lower tie plate. The water passes upwardly interior of the fuel bundle and performs two major functions. First, it moderates so-called fast or energetic neutrons produced in the nuclear reaction to slow or thermal neutrons need to continue the nuclear reaction. Secondly, the water moderator generates steam which is utilized for the generation of power.

It will be understood that the fuel rods interior of the fuel bundles are long slender sealed tubes containing fissionable material and are flexible. If such fuel rods were to be unrestrained, they would vibrate and even come into abrading contact with one another during the generation of steam. To restrain this tendency as well as maintain the fuel rods in their designed side-by-side spacing for efficient nuclear operation, so-called spacers are utilized. These spacers are placed at selected vertical intervals within the fuel bundle. Usually, seven evenly distributed fuel rod spacers are utilized in a fuel bundle having an overall length in the order of 160 inches. These spacers surround each individual fuel rod maintaining the precise designed spacing of the fuel rods along the entire length of the fuel bundle.

It is standard practice to improve the performance of boiling water fuel assemblies by introducing special water regions which distribute controlled amounts of water liquid moderator within the fuel assembly lattice of fuel rods. This is often accomplished by the use of hollow rods ("water rods") or other generally vertically aligned parallel flow conduits, through which substantially single phase water flows. Typically, a small amount of water is bypassed from the lower tie plate region through these water regions—more often referred to as water rods—and finally discharged out the top of the fuel bundle. These controlled water regions are particularly effective in the upper portions of the fuel assembly where neutron moderation is normally reduced by the steam which displaces the liquid water for a large fraction of the coolant flow area. However, since the introduction of such water regions occupies space that would otherwise contain more uranium fuel, the net performance benefits of the water regions are a trade-off between the positive effects of improved neutron moderation and the negative effects of decreased uranium fuel content. As a consequence, careful studies are required to establish optimum shapes and numbers of these water regions in any particular boiling water reactor fuel bundle design.

It is further standard practice for these water regions to extend upward from the bottom of the fuel assembly at the lower tie plate. This is done so that flow holes can be allowed for entry of subcooled water to the water regions from the lower tie plate at the bottom of the fuel assembly. This direct entry of subcooled water to the water regions is used in order to avoid the entry of steam into the water regions and to avoid unknown neutron moderation conditions that would result if both water and vapor were present within the water regions. Having a direct flow of subcooled water to the water regions avoids or minimizes subsequent steam formation from neutronic heating at higher elevations in the fuel bundle within the water regions.

However, extending a water region from the bottom of a fuel assembly also has a detrimental effect on the fuel assembly performance. The adverse effect results from the removal of uranium fuel in the lower region where the adverse effect resulting from the removal of fuel rods is not compensated by large benefits from increased neutron moderation. Thus, this adverse performance in the lower portion of the fuel assembly limits the overall effectiveness achieved through addition of water regions to the boiling water fuel assemblies.

So-called part length rods have been introduced into this standard fuel bundle construction. These part length fuel rods extend from the lower tie plate only partially the distance to the upper tie plate. The fuel rods typically terminate underlying the upper tie plate so as to define an unoccupied vertical interval within the fuel bundle starting at the top of the part length fuel rod and extending to the upper tie plate. These part length fuel rods have many advantages, which advantages are summarized in Dix et al. U.S. patent Ser. No. 07,176,975 entitled TWO-PHASE PRESSURE DROP REDUCTION BWR ASSEMBLY DESIGN now issued as U.S. Pat. No. 5,112,570 on May 12, 1992.

SUMMARY OF THE INVENTION

Part length water regions are located above part length fuel rods in boiling water nuclear reactor fuel bundles. The part length water regions include discrete containers having water entry ports at the top of the part length water regions for capturing water from the passing liquid-vapor stream, and vent ports for permitting internally generated steam from gamma ray and neutronic heating to escape the water region. The advantages of improved neutron moderation in the upper portion of the fuel assembly are present while the uranium fuel removal requirements from the more reactive lower portion of the fuel bundle are minimized.

This design concept allows for greater flexibility in the length, shape, location, and attachment of water regions, since no connection to the region of the lower tie plate is required. In addition, the top filling of the water regions also eliminates the parasitic loss of flow from the active fuel region that occurs with standard bottom entry water region designs.

While this design has inherent advantages by eliminating any connection to the fuel assembly inlet, it also has the inherent disadvantage of not providing liquid subcooling to minimize vapor formation within the upper top filled water region. This internal vapor formation reduces the neutron moderation improvement of the water region. Fortunately, the fraction of liquid displaced by vapor formation is small and easily predictable for the low velocity counter-current flow conditions that exist within these water region designs. In the typical design herein set forth, vapor will typically occupy less than 20% of the water region moderator volume. As a consequence, fuel assembly designs using these top filled water regions must balance these additional trade-offs to optimize overall performance.

In the disclosed openings within the top filled water regions, accommodation is required to vent vapor produced by nuclear particle heating as well as to enable downward flow into the water regions of replacement liquid. The large density of water relative to the surrounding vapor flow in the upper two phase region of the fuel bundle produces a countercurrent flow condition with downward liquid flow into the water region. However, to assure that sufficient replacement liquid enters the water region, it is advantageous to have devices which deflect liquid into the top openings of the water region. Such devices can act on liquid which flows as a film on the exterior surface of the water region. Flow openings can also be placed adjacent to existing upper tie plate or top fuel rod spacers, and thereby use the normally occurring flow diversions at those locations to deflect liquid into the top of the water regions.

DESCRIPTION OF THE PREFERRED EMBODIMENT

Figure 1:
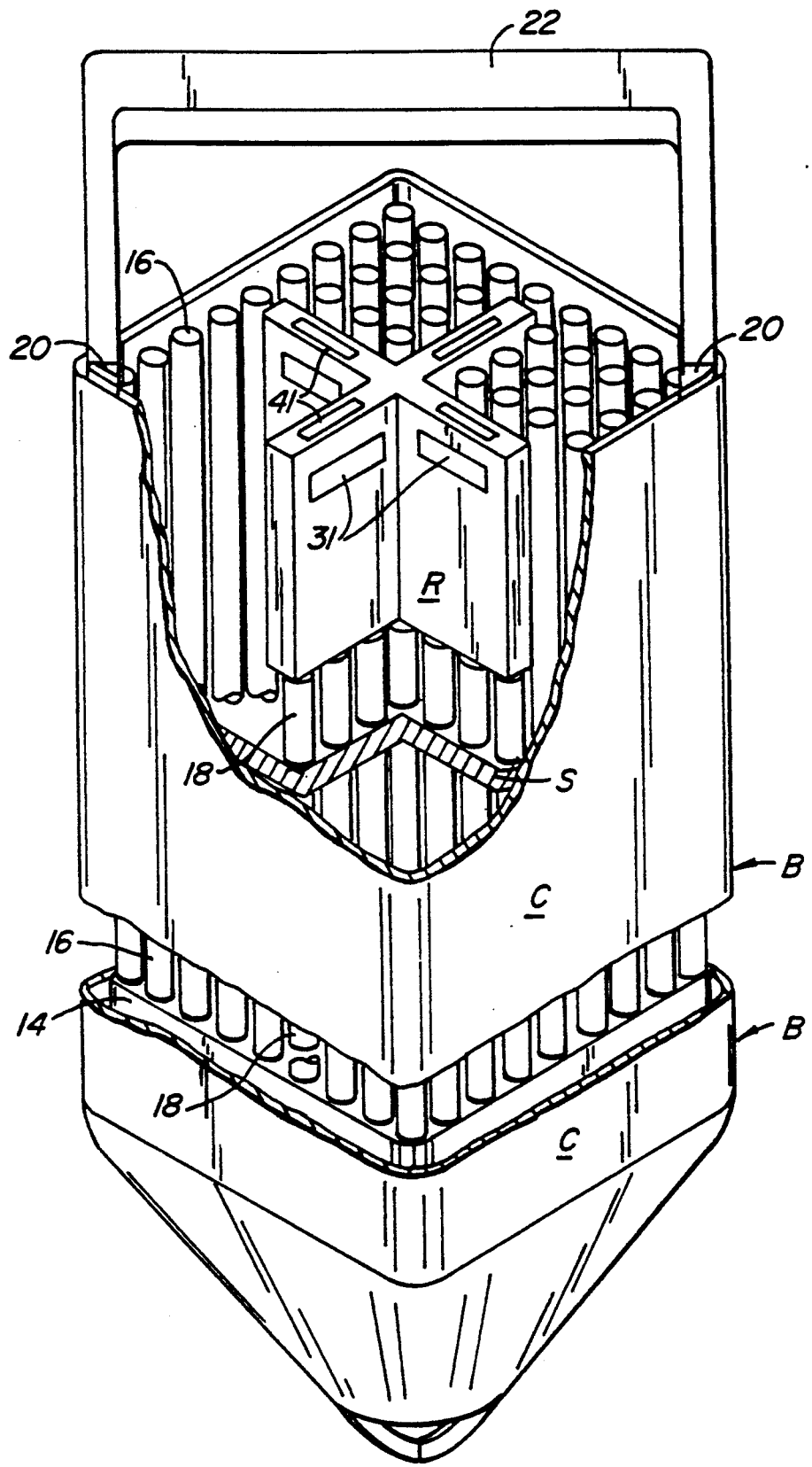
FIG. 1 is a perspective view partially broken away of a typical fuel bundle incorporating part length fuel rods with overlying top filled water regions, the fuel bundle being shown with the greater portion of its length being omitted with the illustration giving emphasis to the upper two phase region of the bundle.

Referring to FIG. 1, a perspective view of a fuel bundle B containing the top filled water region R is shown. The fuel bundle includes a lower tie plate 14 for supporting an upstanding matrix of fuel rods including full length fuel rods 16 and part length fuel rods 18. Only one spacer S is illustrated, this spacer being shown even with the top portion of the part length fuel rods 18 for both maintaining the full length fuel rods 16 and part length fuel rods 18 in their designed side-by-side relation as well as supporting the ends of the part length fuel rods 18.

An upper tie plate 20 is only partially shown at the point of attachment of fuel bundle lifting bail 22. This upper tie plate 20 is the point to which full length fuel rods 16 attach. In a typical fuel bundle B construction, certain of the full length fuel rods (called tie rods) are threaded at the top and bottom used to tie the respective lower tie plate 14 and the upper tie plate 20 together.

A channel C extends around the lower tie plate 14 at the bottom, the upper tie plate 20 at the top and serves to confine fluid flow between the tie plates to the exclusion of fluid flow exterior of the fuel bundle B. Since lower tie plate 14 admits single phase coolant and the upper tie plate 20 discharges both liquid coolant and generated steam, it will be understood that part length water region R is located in the upper so-called two phase region of the fuel bundle B.

In the particular view shown in FIG. 1, a cruciform water region R is illustrated within a 9 by 9 matrix of fuel rods 16,18. Further, part length fuel rods 18 are also placed in a cruciform shaped matrix underlying cruciform shaped water region R. Thus, it will be understood that the part length water region R occupies the spatial interval between the top of part length fuel rods 18 and the bottom of upper tie plate 20.

Figure 3:
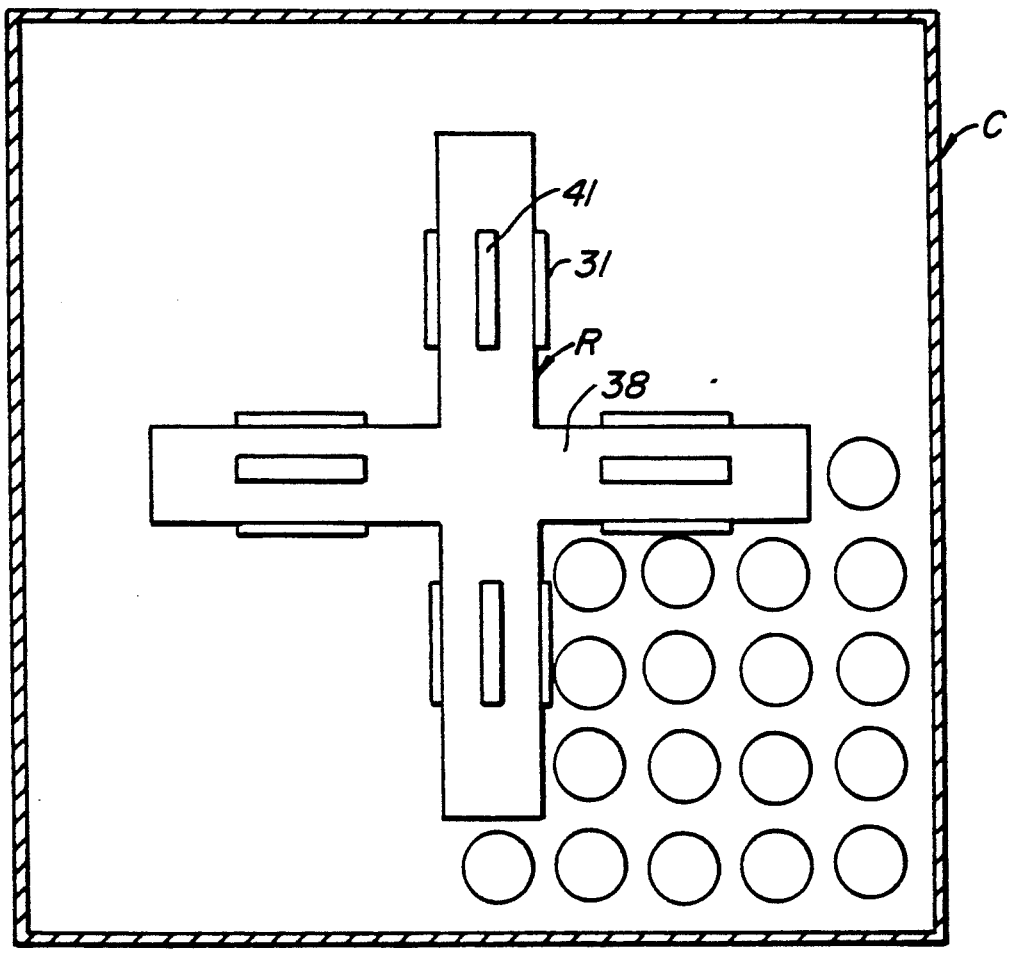
FIGS. 3 and 4 are respective top plan and side elevation sections of part length top filled water regions overlying part length fuel rods.
Figure 4:
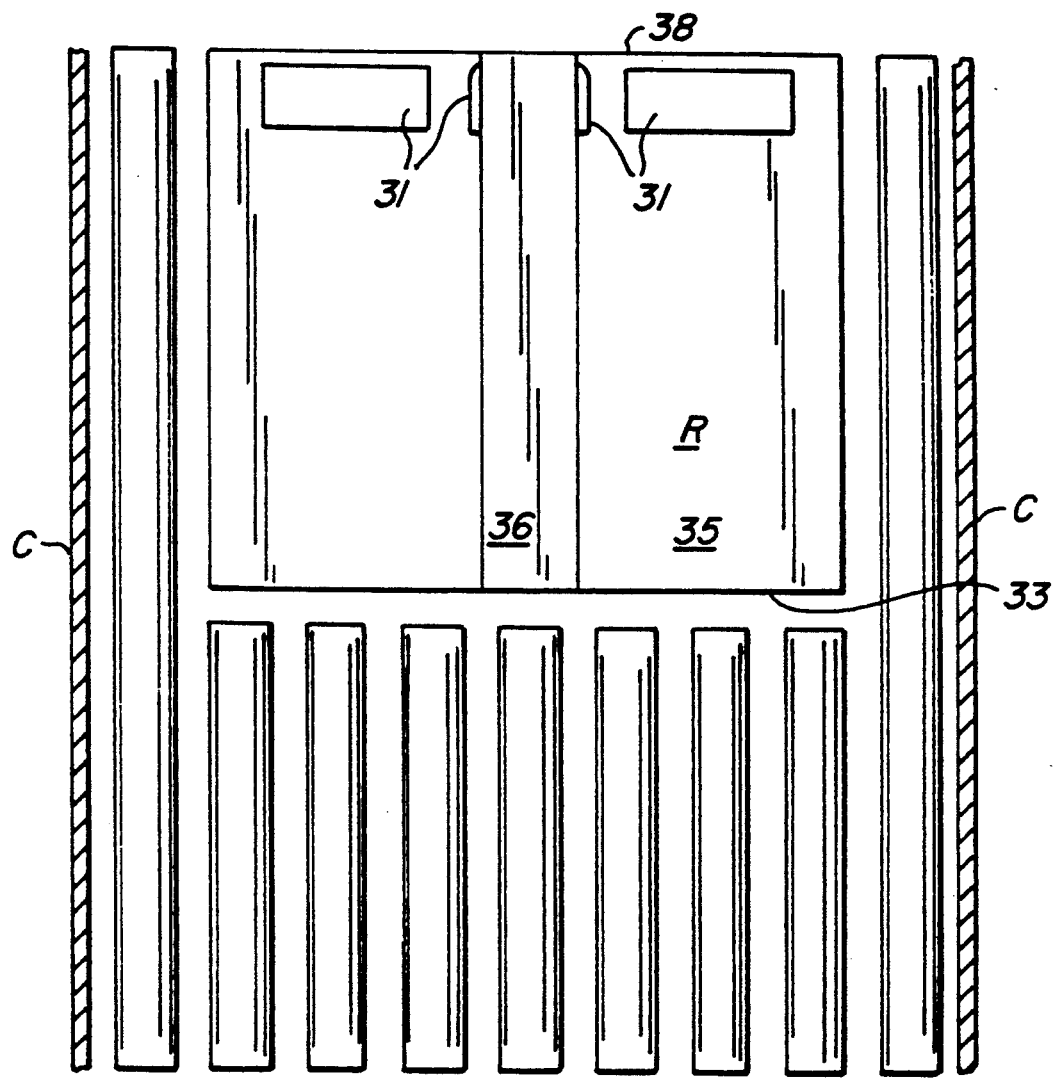

Referring to FIGS. 3 and 4, the construction of the top filled water region R can be further understood. Region R includes cruciform sectioned bottom wall 33 and side walls 35, 36. At least the bottom walls and side walls are sealed so as to define within water region R a fluid tight container. Thus water captured within part length water region R will remain within the water region, except for that converted to steam by neutronic heating.

It will be understood that the part length water region R could possibly have an open top—although this is not preferred.

Provision must be made for liquid entry into the top of water region R as well as the escape of generated vapor from the water confined within water region R. Accordingly, and referring to FIGS. 7 and 8, construction of water entry port 31 and vapor exit port 41 are illustrated.

Figure 7:
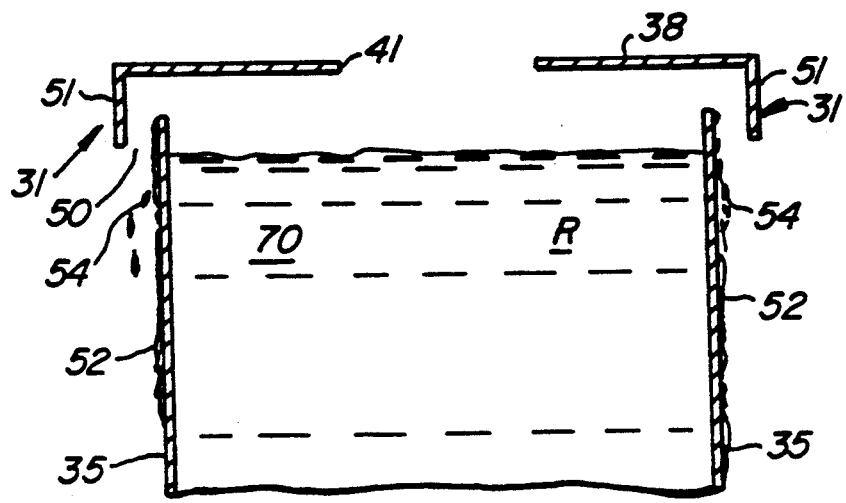
FIG. 7 is a detail of the top filled water region at the upper portion thereof with a flow opening at the top extending outwardly of the sidewall of the top filled water region for deflecting and diverting downward water particles flowing along the side of the top filled water region and includes a central upper vent opening for allowing escape of vapor from the water region; and, FIG. 8 is an illustration similar to FIG. 7 with water scoop openings being inward from the cross sectional dimension of the top filled water region and containing scoops for diverting and counter flowing passing water particles to fill the region.

Referring to FIG. 7, the preferred construction of water entry port 31 is illustrated. A scoop opening 51 protrudes outwardly over side 35 of top filled water region R. As is known in the boiling water nuclear art, water layer 52 tends to accumulate on the side of side wall 35 and flow along side wall 35 in a thin film 52. This thin film 52—together with liquid particles 54 in the upward passing two phase flow of steam and water tend to be scooped to the interior of part length water region R. Thus, and with normal operation of fuel bundle B, part length water region R will fill with water.

It is to be understood that water region R has a source of heating from the ambient neutron flux within fuel bundle B. Consequently, vent opening 41 is defined in top 38 for escape of generated steam. Fortunately, the amount of vapor present in top filled water region R is predictable—usually on the order of 20%. This being the case, approximately 80% of top filled water region R will be filled with liquid.

Figure 8:
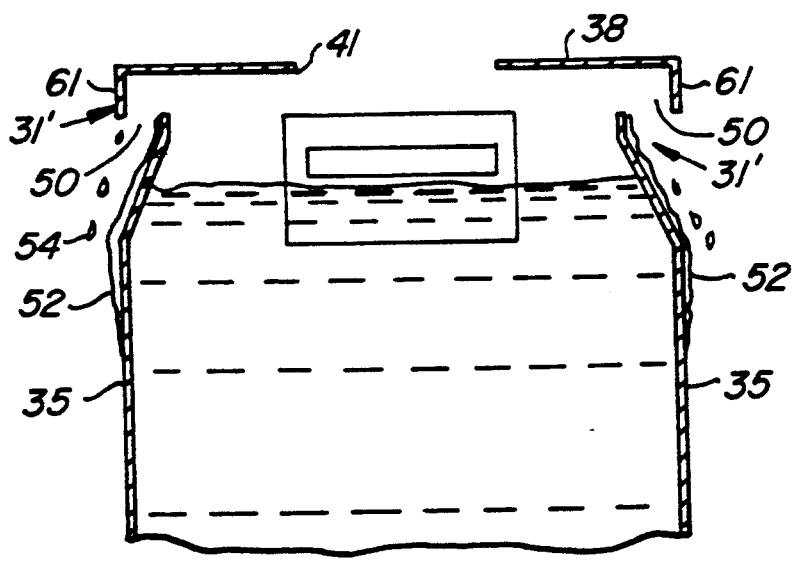

Referring to FIG. 8, top filled water region R is shown with an alternate side scoop construction 31', Simply stated, wall 35 recess under top edge 61. Liquid film 52 and liquid particles 54 moving along side wall 35 are deflected into the top portion of top filled water region R. Again, vapor vent 41 in top 38 provides for the escape of neutronic heating generated vapor from the confined water 70.

Figure 2:
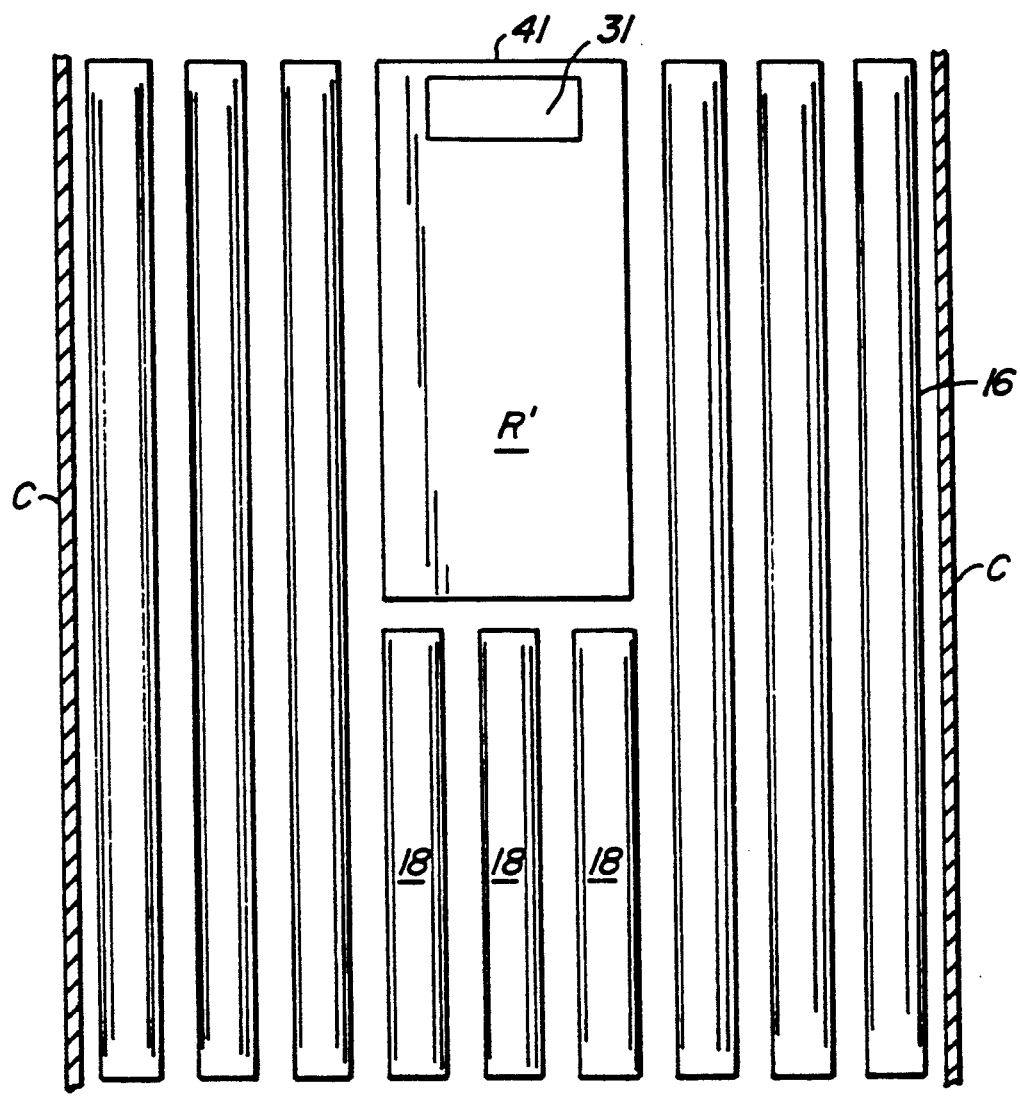
FIG. 2 indicates a representative implementation of the top filled water region design of this invention with a large single part length water region—either circular or square—overlying a matrix of nine part length fuel rods.

While we show a cruciform sectioned top filled water region R, it will understand that this invention will admit of a variety of constructions. For example, top filled water region R' is shown in FIG. 2 being essentially square in cross section and overlying nine part length fuel rods in a 3 by 3 array.

Figure 5:
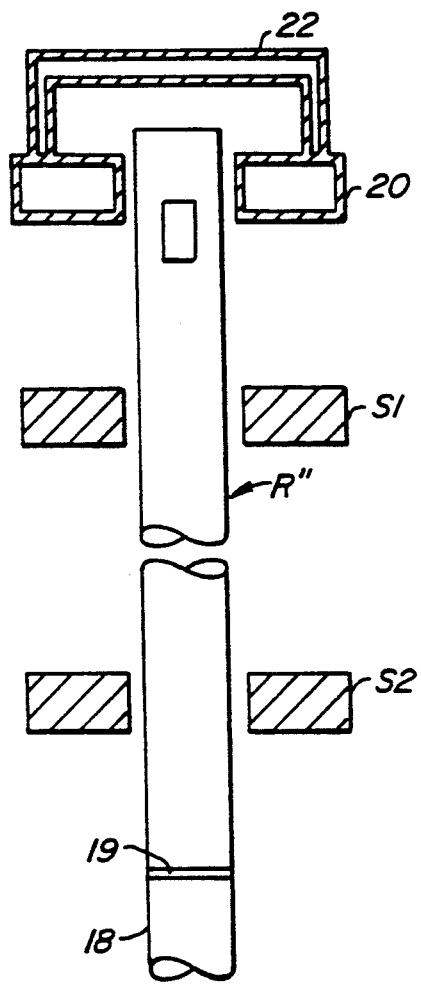
FIG. 5 illustrates a part length fuel rod having a part length top filled water region immediately overlying the part length fuel rod with the view here illustrating protrusion of the part length water region through the upper tie plate.
Figure 6:
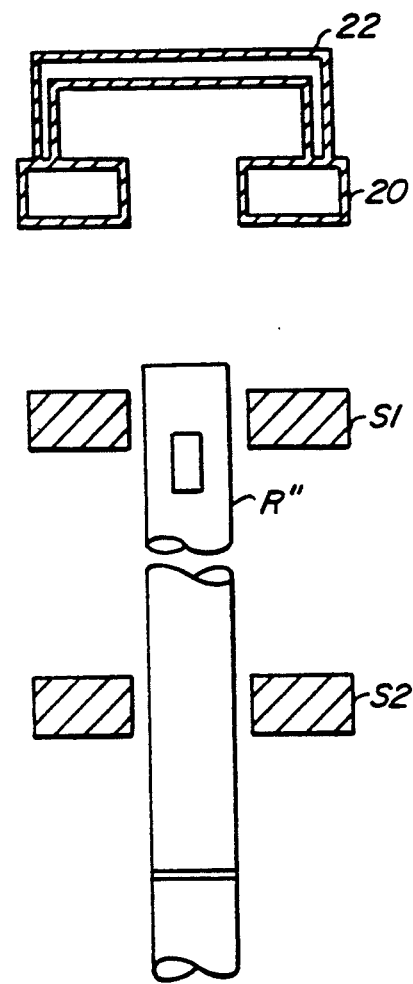
FIG. 6 is a view similar to FIG. 5 with the part length water region terminating below the upper tie plate.

Further, it will be understood with respect to FIG. 5 and 6 that the construction of the top filled water region R" may both be discrete with respect to each part length fuel rod 18, constituting a cylinder extending beyond the end 19 of each part length fuel rod 18. Further, the top filled water region R" can either terminate above upper tie plate 20 as shown in FIG. 5 or terminate below upper tie plate 20 as shown in FIG. 6.

It will be understood that the length of the top filled water region with respect to the overall length of the fuel bundle is limited. Specifically, the generation of steam by neutronic heating within the top filled water region R will cause vapor to rise within the accumulated liquid. This being the case, a counter current flow limiting condition can occur within top filled water region R. If the region is too long, the upwardly rising vapor will carry contained water with its flow—rendering the amount of water within top filled water region R essentially unpredictable.

As a consequence of this phenomenon, we prefer to terminate the top filled water region just above the 5th or 6th spacer—assuming that the heat generating part of the fuel bundle has about a 150 inch length. With this length, the amount of contained liquid within top filled water region R is predictable and can constitute a known in the nuclear design.

Attachment of the top filled water region R can occur by any expedient. In the illustrated example, we have attachment of the top filled water region R to those spacer S which adjoin the top filled water region.

What is claimed is:

1. In a fuel bundle having a matrix of upstanding vertical fuel rods, a lower tie plate for supporting said fuel rods and permitting the entry of water into the bottom single phase region of said fuel bundle, an upper tie plate for permitting at least some of said fuel rods to extend to said upper tie plate and to permit the exit of water and generated steam from the upper two phase region of said fuel bundle; and, an enclosing channel having said lower tie plate at the bottom end, said upper tie plate at the upper end, and surrounding said fuel rod matrix between said tie plates to permit the flow of water and vapor moderator between said tie plates;

the improvement to said fuel bundle comprising:

at least some of said matrix of upstanding vertical fuel rods being part length fuel rods commencing at said lower tie plate and extending into the two phase region of said fuel bundle below said upper tie plate so as to define between the end of said part length fuel rods and said upper tie plate a spatial interval; and, means for defining at least one water region occupying at least one interval between one of said part length fuel rods and said upper tie plate, said means for defining at least one water region having sides and a closing bottom for maintaining a volume of liquid water within said region;

means at the top of said water region for permitting the exit and entry of water to and exit of steam from said water region whereby said water region accumulates water moderator from said passing two phase water and steam mixture adjacent said water region.

2. The invention of claim 1 and wherein said means for defining said at least one water region includes a single chamber overlying a plurality of side-by-side part length fuel rods.

3. The invention of claim 1 and wherein said means for defining said at least one water region defines a cruciform shaped cross sectional water region transversely across a region of said fuel bundle, said cruciform cross sectional water region overlying part length fuel rods placed in a corresponding cruciform cross sectional region underlying said part length water region.

4. The invention of claim 1 and wherein said means at the top of said water region for permitting the entry and exit of water and steam includes means extending into the two phase flow region of said fuel bundle for diverting water into the top of said water region.

5. The invention of claim 4 and wherein said means extending into the two phase flow region of said fuel bundle for diverting water into the top of said water region overlies a surface along which water flows during normal operation of said fuel bundle.

6. The invention of claim 4 and wherein said means extending into the two phase flow region of said fuel bundle for diverting water into the top of said water region is recessed with respect to the cross sectional profile of said water region.

7. In a fuel bundle for a boiling water nuclear reactor comprising:

a matrix of upstanding vertical fuel rods, a lower tie plate for supporting said fuel rods and permitting the entry of water into the bottom of said fuel bundle, an upper tie plate for permitting at least some of said fuel rods to extend to said upper tie plate and to permit the exit of water and generated steam from the upper two phase region of said fuel bundle;

an enclosing channel having said lower tie plate at the bottom end, said upper tie plate at the upper end, and surrounding said fuel rod matrix between said tie plates to permit the flow of water and vapor moderator between said tie plates;

at least some of said matrix of upstanding vertical fuel rods being part length fuel rods commencing at said lower tie plate and extending into the two phase region of said fuel bundle below said upper tie plate so as to define between the end of said part length fuel rods and said upper tie plate a spatial interval;

means for defining at least one water region occupying the interval between said part length fuel rod and said upper tie plate; said means for defining at least one water region having sides and a closing bottom;

means at the top of said water region for permitting the exit and entry of water and steam to said water region whereby said water region accumulates water moderator from said passing two phase water and steam mixture adjacent said water region.

8. The invention of claim 7 and wherein:
a discrete top filled water region overlies a discrete part length fuel rod.

9. The invention of claim 7 and wherein:
a discrete top filled water region overlies more than one part length fuel rods.

10. The invention of claim 7 and wherein said means at the top of said water region for permitting the entry of water and exit of steam includes means extending into the two phase flow region of said fuel bundle for diverting water into the top of said water region.

* * * * *